United States Patent
Moshchuk et al.

(10) Patent No.: US 11,772,641 B2
(45) Date of Patent: Oct. 3, 2023

(54) VEHICLE LATERAL MOTION MANAGEMENT WITH PREVIEW ROAD SURFACE INFORMATION

(71) Applicant: GM GLOBAL TECHNOLOGY OPERATIONS LLC, Detroit, MI (US)

(72) Inventors: Nikolai Moshchuk, Grosse Pointe Farms, MI (US); Bakhtiar Litkouhi, Washington, MI (US); Qingrong Zhao, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 229 days.

(21) Appl. No.: 17/303,304

(22) Filed: May 26, 2021

(65) Prior Publication Data

US 2022/0379881 A1 Dec. 1, 2022

(51) Int. Cl.
*B60W 30/09* (2012.01)
*B60W 30/18* (2012.01)
(Continued)

(52) U.S. Cl.
CPC .......... *B60W 30/09* (2013.01); *B60Q 9/008* (2013.01); *B60W 10/18* (2013.01); *B60W 10/20* (2013.01); *B60W 30/18163* (2013.01); *B60W 50/14* (2013.01); *B60W 2552/30* (2020.02); *B60W 2552/35* (2020.02); *B60W 2710/18* (2013.01); *B60W 2710/20* (2013.01)

(58) Field of Classification Search
CPC ...... B60W 30/09; B60W 10/18; B60W 10/20; B60W 30/18163; B60W 50/14; B60W 2552/35; B60W 2552/30; B60W 2710/18; B60W 2710/20; B60Q 9/008

USPC ........................................................... 701/26
See application file for complete search history.

(56) References Cited

U.S. PATENT DOCUMENTS

| | | | | |
|---|---|---|---|---|
| 6,597,980 B2 * | 7/2003 | Kogure | ................ | B60W 40/10 701/80 |
| 2012/0323460 A1 * | 12/2012 | Okubo | .................... | B60T 8/172 701/1 |

(Continued)

FOREIGN PATENT DOCUMENTS

| | | | | |
|---|---|---|---|---|
| EP | 2554449 A1 * | 2/2013 | ............ | B60K 17/35 |
| WO | WO-2019166142 A1 * | 9/2019 | ............ | B60W 10/20 |

OTHER PUBLICATIONS

Raymond et al., "Tire/road friction coefficient estimation applied to road safety," 2010, Publisher: IEEE.*

(Continued)

*Primary Examiner* — Tuan C To
(74) *Attorney, Agent, or Firm* — Lorenz & Kopf, LLP

(57) ABSTRACT

Systems and method are provided for controlling a vehicle. In one embodiment, a method includes: receiving a first surface value associated with a first road surface area in an upcoming environment of the vehicle; receiving a second surface value associated with a second road surface area in the upcoming environment of the vehicle; determining a change in surface value based on the first surface value and the second surface value; and in response to the change in surface value being greater than a threshold, adapting at least one of vehicle collision warning messages, vehicle braking control, vehicle steering control, and path planning based on the second surface value.

18 Claims, 4 Drawing Sheets

(51) Int. Cl.
  *B60W 10/18* (2012.01)
  *B60W 10/20* (2006.01)
  *B60W 50/14* (2020.01)
  *B60Q 9/00* (2006.01)

(56) References Cited

U.S. PATENT DOCUMENTS

| | | | |
|---|---|---|---|
| 2013/0131947 A1* | 5/2013 | Takahashi | B60T 7/18 701/70 |
| 2016/0176408 A1* | 6/2016 | Lynch | B60W 60/0053 701/23 |
| 2017/0166216 A1* | 6/2017 | Rander | B60W 30/182 |
| 2017/0168489 A1* | 6/2017 | Rander | G01C 21/3822 |
| 2017/0168495 A1* | 6/2017 | Wood | B60W 10/184 |
| 2017/0168500 A1* | 6/2017 | Bradley | G01C 21/3822 |
| 2019/0001988 A1* | 1/2019 | Ienaga | G08G 1/096775 |
| 2019/0092326 A1* | 3/2019 | Honda | B60W 60/0011 |
| 2020/0172065 A1* | 6/2020 | Watanabe | B60T 8/1764 |
| 2021/0171051 A1* | 6/2021 | Takeda | B60W 50/082 |
| 2021/0188284 A1* | 6/2021 | Hassel | B60W 10/20 |
| 2021/0310932 A1* | 10/2021 | Toba | G01N 19/02 |
| 2022/0063630 A1* | 3/2022 | Park | G06V 20/588 |

OTHER PUBLICATIONS

Sanghyun et al., "Tire-Road Friction Coefficient Estimation with Vehicle Steering," 2013, Publisher: IEEE.*

* cited by examiner

VEHICLE LATERAL MOTION MANAGEMENT WITH PREVIEW ROAD SURFACE INFORMATION

INTRODUCTION

The present disclosure generally relates to vehicle controls, and more particularly relates to systems and methods for managing vehicle lateral motion based on preview road surface information.

Sensor data and/or models can be used to determine surface conditions ahead of the vehicle in real-time. In some instances, a surface area of the upcoming road be estimated as a low friction surface area for example, due to snow or ice. In such instances, it is desirable to modify autonomous or semi-autonomous control of the vehicle to account for the low friction conditions.

For example, control/driver interface methods for autonomous or semi-autonomous features, such as lane centering, lane change, collision imminent steering, collision imminent braking, may lead to a loss of tracking capabilities when the vehicle encounters a change in the surface condition such a change from high to low friction). It is desirable to modify these control/driver interface methods to account for this change. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for controlling a vehicle. In one embodiment, a method includes: receiving a first surface value associated with a first road surface area in an upcoming environment of the vehicle; receiving a second surface value associated with a second road surface area in the upcoming environment of the vehicle; determining a change in surface value based on the first surface value and the second surface value; and in response to the change in surface value being greater than a threshold, adapting at least one of vehicle collision warning messages, vehicle braking control, vehicle steering control, and path planning based on the second surface value.

In various embodiments, the adapting of the vehicle collision warning messages includes adapting a timing of generating the vehicle collision warning messages based on the change in surface value.

In various embodiments, the adapting of the vehicle braking control includes adapting a timing of generating a vehicle braking command based on the change in surface value.

In various embodiments, the adapting of the vehicle steering control includes adapting a timing of generating a vehicle steering command based on the change in surface value.

In various embodiments, the method further includes projecting the second surface value to waypoints of an upcoming path, and wherein the adapting is based on the waypoints and the projected surface values.

In various embodiments, the adapting of the vehicle braking control includes adapting a vehicle braking command based on model predictive control that is based on the projected surface values.

In various embodiments, the adapting of the vehicle steering control includes adapting a steering control command based on model predictive control that is based on the projected surface values.

In various embodiments, the adapting of the path planning includes comparing a path curvature to a maximum path curvature for a surface mu.

In various embodiments, the adapting of the path planning includes modifying the path to position the vehicle in a new lane in response to a result of the comparing.

In various embodiments, the method further includes computing an error, and wherein the adaptation of path planning is performed in response to the error being greater than a threshold.

In another embodiment, a system for controlling a vehicle includes: at least one sensor that senses road surfaces in an environment of the vehicle; and a control module configured to, by a processor, receive a first surface value associated with a first road surface area in an upcoming environment of the vehicle, receive a second surface value associated with a second road surface area in the upcoming environment of the vehicle, determine a change in surface value based on the first surface value and the second surface value, and in response to the change in surface value being greater than a threshold, adapt at least one of vehicle collision warning messages, vehicle braking control, vehicle steering control, and path planning based on the second surface value.

In various embodiments, the control module adapts the vehicle collision warning messages by adapting a timing of generating the vehicle collision warning messages based on the change in surface value.

In various embodiments, the control module adapts the vehicle braking control by adapting a timing of generating a vehicle braking command based on the change in surface value.

In various embodiments, the control module adapts the vehicle steering control by adapting a timing of generating a vehicle steering command based on the change in surface value.

In various embodiments, the control module is further configured to project the second surface value to waypoints of an upcoming path, and adapt based on the waypoints and the projected surface values.

In various embodiments, the control module adapts the vehicle braking control by adapting a vehicle braking command based on model predictive control that is based on the projected surface values.

In various embodiments, the control module adapts the vehicle steering control by adapting a steering control command based on model predictive control that is based on the projected surface value.

In various embodiments, the control module adapts the path planning by comparing a path curvature to a maximum path curvature for a surface mu.

In various embodiments, the control module adapts the path planning by modifying the path to position the vehicle in a new lane in response to a result of the comparing.

In various embodiments, the control module is further configured to compute an error, and adapt the path planning in response to the error being greater than a threshold.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
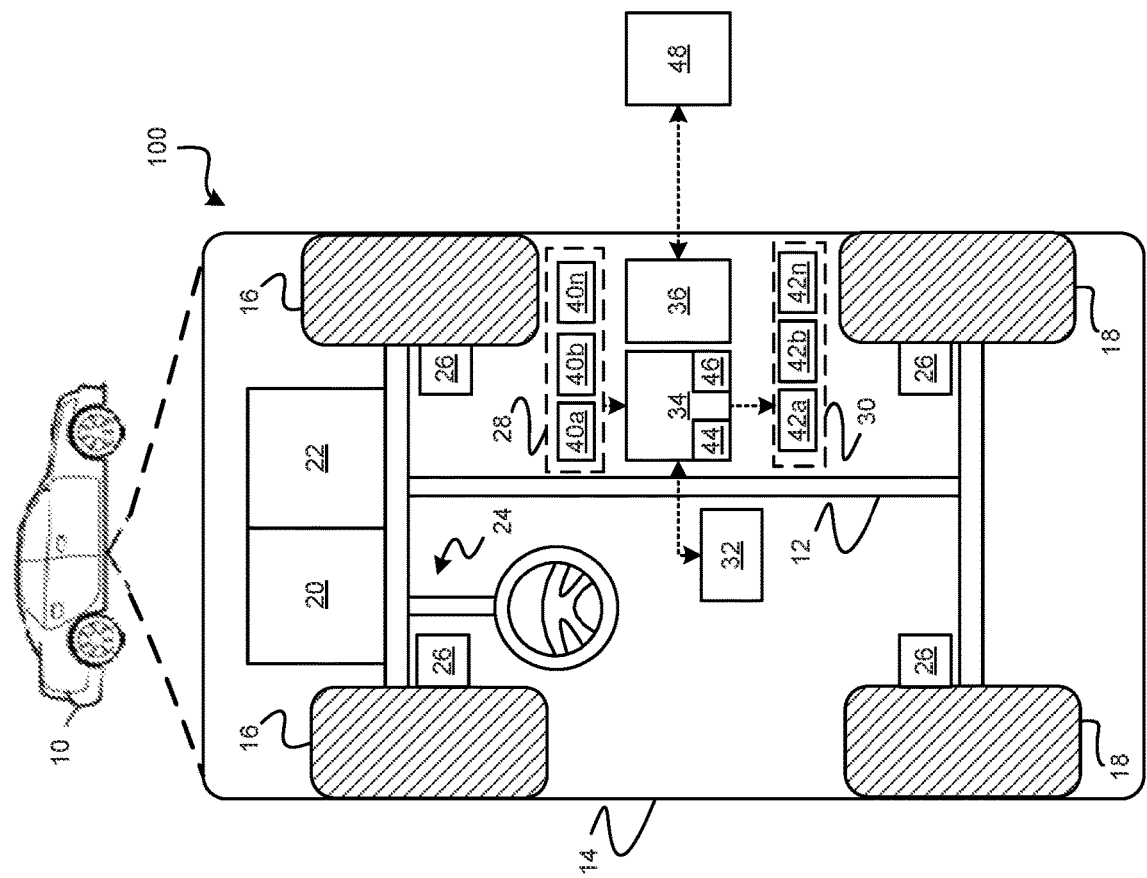
FIG. 1 is a functional block diagram illustrating an autonomous vehicle having a surface based control system, in accordance with various embodiments.

With reference to FIG. 1, a surface based control system shown generally at 100 is associated with a vehicle 10 in accordance with various embodiments. As will be discussed in more detail below, the surface based control system 100 continuously monitors an environment of the vehicle 10 and determines a surface value associated with an upcoming road. The surface based control system 100 performs automated maneuvers or assists the driver in performing complex maneuvers, while providing warnings or preparing the vehicle for transfer of control in the presence of a determined upcoming change in road surface conditions (e.g., upcoming slippery road condition).

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is autonomous in that it provides partial or full automated assistance to a driver operating the vehicle 10. As used herein the term operator is inclusive of a driver of the vehicle 10 and/or an autonomous driving system of the vehicle 10.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, inertial measurement units, and/or other sensors.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
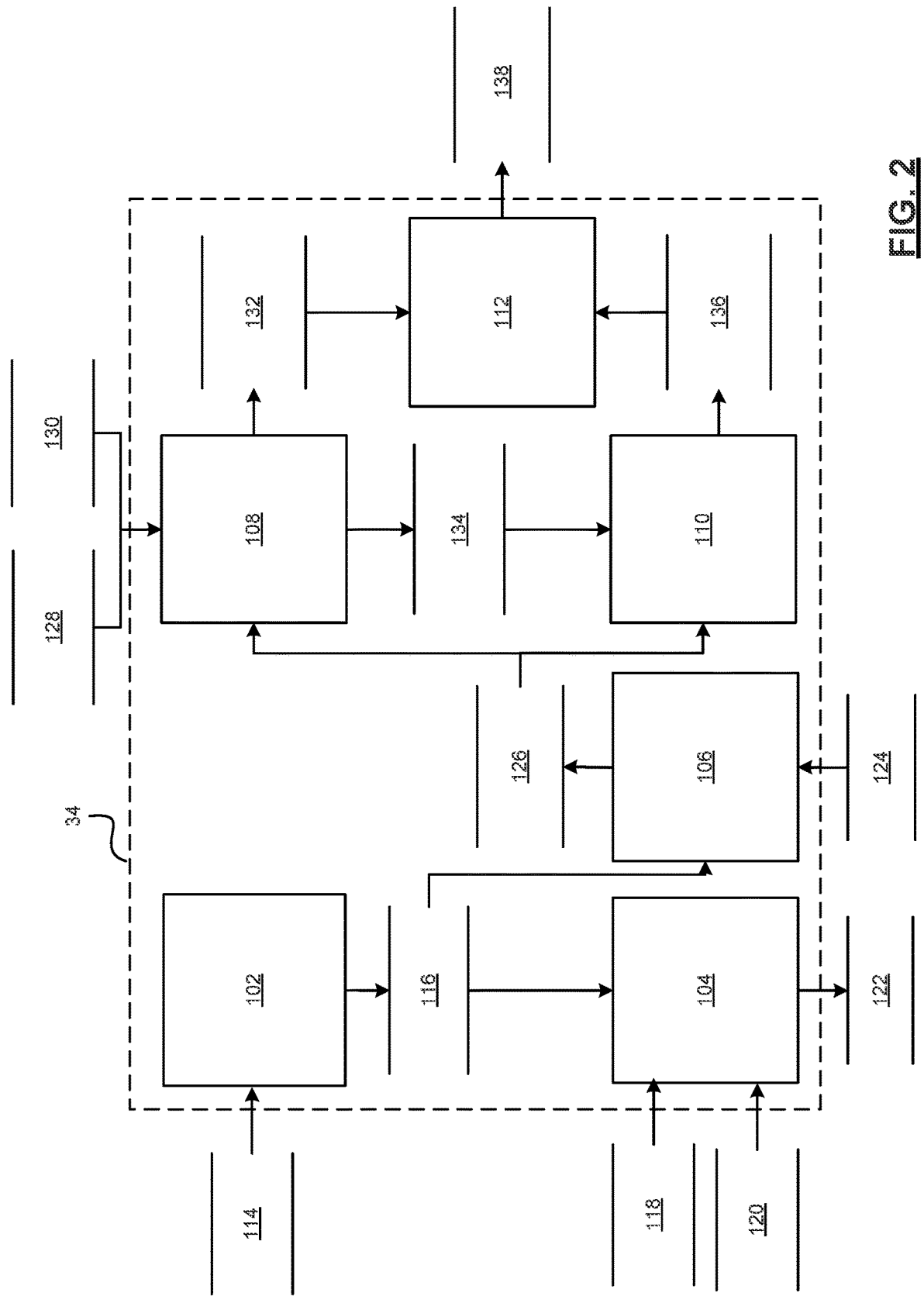
FIG. 2 is a dataflow diagram illustrating a control module of the surface based control system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate by communication messages over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the system 100. The instructions, when executed by the processor 44, predict surface conditions of an upcoming road and control one or more features of the vehicle 10 based thereon.

As can be appreciated, the subject matter disclosed herein provides certain enhanced features and functionality to what may be considered as a standard or baseline autonomous or semi-autonomous vehicle 10. To this end, an autonomous vehicle and semi-autonomous vehicle can be modified, enhanced, or otherwise supplemented to provide the additional features described in more detail below.

Referring now to FIG. 2, and with continued reference to FIG. 1, a dataflow diagram illustrates various embodiments of the control module 34 of FIG. 1. Various embodiments of the control module 34 according to the present disclosure may include any number of sub-modules. As can be appreciated, the sub-modules shown in FIG. 2 may be combined and/or further partitioned to similarly determine surface conditions and control the vehicle 10 based thereon. Inputs to the control module 34 may be received from the sensing devices 40a-40n or received from other control modules (not shown) of the vehicle 10, and/or determined by other sub-modules (not shown) of the control module 34. In various embodiments, the control module 34 includes a surface change determination module 102, a collision judgment line adjustment module 104, a waypoint adjustment module 106, a control adjustment module 108, a path adjustment module 110, and a latitude/longitude control module 112.

In various embodiments, the surface change determination module 102 receives as input surface data 114 sensed from one or more sensing devices 40a-40n of the vehicle 10. The surface data 114 includes a first surface value associated with a first road surface in an upcoming environment of the vehicle 10 and a second road surface in the upcoming environment of the vehicle 10. The surface change determination module 102 determines a change in the surface values between the two surface areas in at the upcoming environment of the vehicle 10. The surface change determination module 102 generates surface change data 116 including the two surface values and a flag indicating when the computed change is greater than a threshold.

In various embodiments, the collision judgment line adjustment module 104 receives as input the surface change data 116, vehicle data 118 including velocity and acceleration of the vehicle 10, and vehicle data 120 associated with another vehicle identified as a potential collision vehicle. The collision judgment line adjustment module 104 adjusts a timing of when automated control and/or warning features are initiated based on the surface change data 116. For example, as shown in more detail in FIG. 3, a time to collision timeline 200 illustrates a timing (in seconds) of warning and/or control activities for default surface mu (e.g., $\mu_1=1$); and a second time to collision timeline 202 illustrates a timing (in seconds) of warning and/or control activities for the surface mu (e.g., $\mu_2=0.5$) of the second surface.

In various embodiments, as shown, the collision judgment line adjustment module 104 adjusts a timing from the time 204 to the time 206 indicating when to initiate warnings to a driver. The collision judgment line adjustment module 104 generates timing data 122 for use by a collision system based thereon.

In various embodiments, as shown, the collision judgment line adjustment module 104 adjusts a timing from time 208 to time 210 indicating when full braking should occur. The collision judgment line adjustment module 104 generates timing data 122 based on the following relationship:

$$TTC_{full\ braking} = \frac{V}{2\mu_1 a} + T_2\left(1 - \frac{\mu_2}{\mu_1}\right).$$

In various embodiments, the collision judgment line adjustment module 104 adjusts a timing from time 212 to time 214 indicating when full steering should occur. The collision judgment line adjustment module 104 generates timing data 122 based on the following relationship:

$$TTC_{full\ steer} = T_2\sqrt{1 - \frac{\mu_2}{\mu_1} + \frac{2w}{\mu_1 a T_2^2}},\ = T_2 = \frac{s_2}{V}.$$

In various embodiments, the collision judgment line adjustment module 104 adjusts a timing from time 216 to time 218 indicating when optimal combined braking and steering should occur such as, an emergency lane change. The collision judgment line adjustment module 104 generates timing data 122 based on the default value and the adjustment to the timing steering.

As can be appreciated, other timing can be adjusted in various embodiments as the disclosure is not limited to the present examples.

With reference back to FIG. 2, the waypoint adjustment module 106 receives as input the surface change data 116, and waypoint data 124 defining points of the upcoming path. The waypoint adjustment module 106 reformulates the waypoints of the path to include future surface values. For example, the current surface mu at time t is determined as μ(t); and the current curvature value at time t is defined as h(t). The waypoint adjustment module 106 projects future friction values: μ(t+nτ). The waypoint adjustment module 106 then associates the future friction values with the curvature values of the waypoints on time. The waypoint adjustment module 106 provides reformulated waypoint data 126 including waypoints defined by the curvature and the surface value.

In various embodiments, the control adjustment module 108 receives as input the reformulated waypoint data 126, braking command data 128, and/or steering command data 130. When lateral control is active in the vehicle 10, the control adjustment module 108 adjusts the steering command and/or the braking command based on the reformulated waypoint data 126. For example, the control adjustment module 108 uses model predictive control to adjust the steering command and/or the braking command. In one example, a non-linear bicycle model can be modified to take into account the surface values:

$$M\dot{V}_y = -MrV_x + F_{yf}(\alpha_f,\mu(t))\cos(\delta) + F_{yr}(\alpha_r,\mu(t)) - Mg\cos(\theta)\sin(\varphi)$$

$$I_z\dot{r} = aF_{yf}(\alpha_f,\mu) - bF_{yr}(\alpha_r,\mu(t))$$

$$\dot{d} = V_y + (V_x + dr)\tan\Delta\psi$$

The control adjustment module 108 then computes error tracking data 134. For example, a lateral heading and offset error can be computed based on:

$$\Delta\dot{\psi} = r - \chi\frac{V_x + dr}{\cos\Delta\psi}.$$

In various embodiments, the path adjustment module 110 receives as input the reformulated waypoint data 126, and the error tracking data 134. The path adjustment module 110 adjusts the upcoming path by redistributing the path curvature to satisfy the friction limitations. For example, the path curvature (x) is adjusted between each waypoint to a value less than a maximum allowable path curvature for the surface mu at x. The path adjustment module 110 generates adjusted path data 136 based on the adjusted values.

The lateral and longitudinal control module 112 receives as input the adjusted command data 132, and the adjusted path data 136. The lateral and longitudinal control module 112 generates control signals 138 to the actuators of the vehicle 10 to control the steering and/or braking of the vehicle 10 such that the vehicle follows the road wheel angle, the braking, and/or the adjusted path indicated by the received data.

Figure 3:
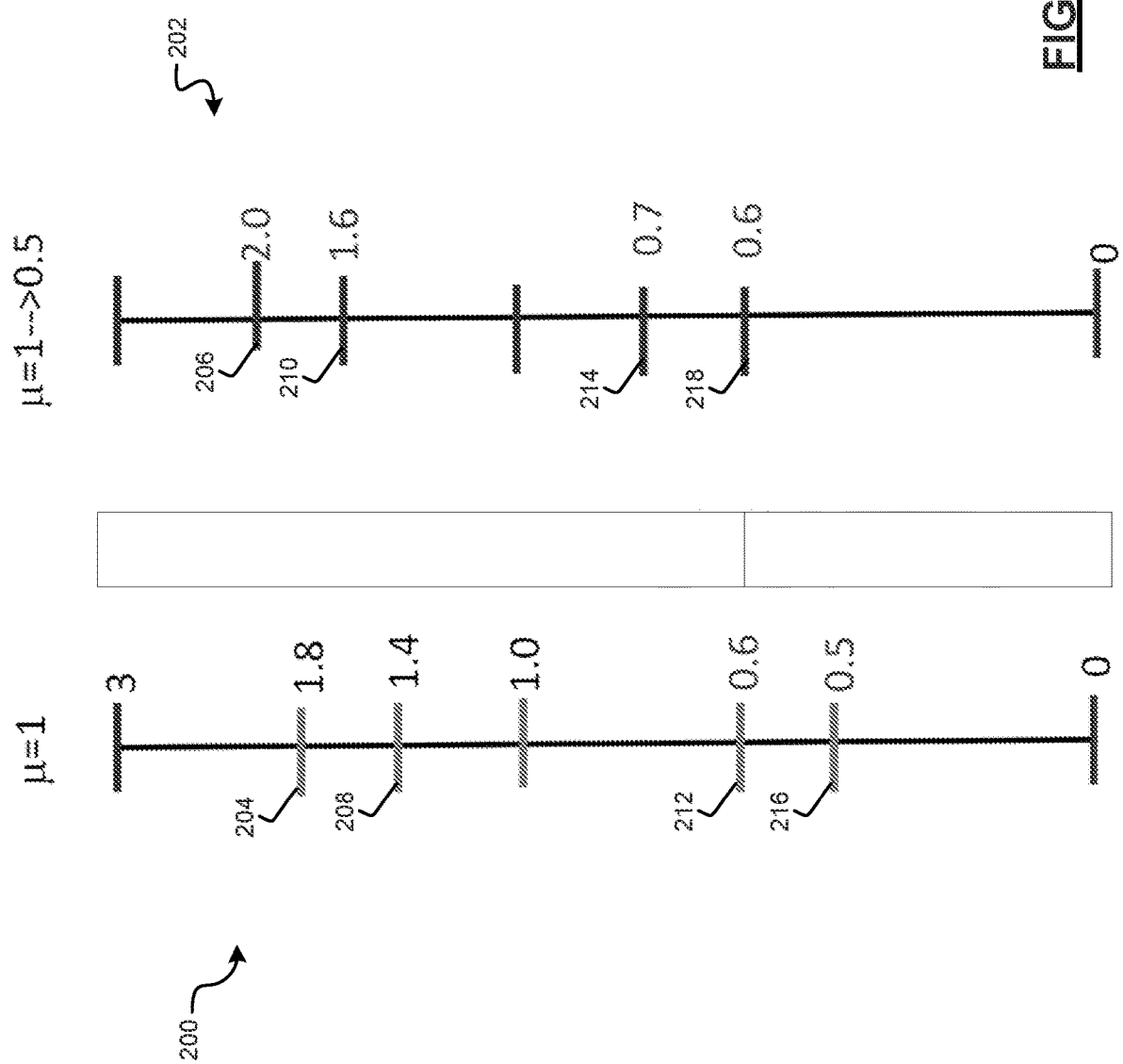
FIG. 3 is a timing chart illustrating timing and control of the surface based control system, in accordance with various embodiments.
Figure 4:
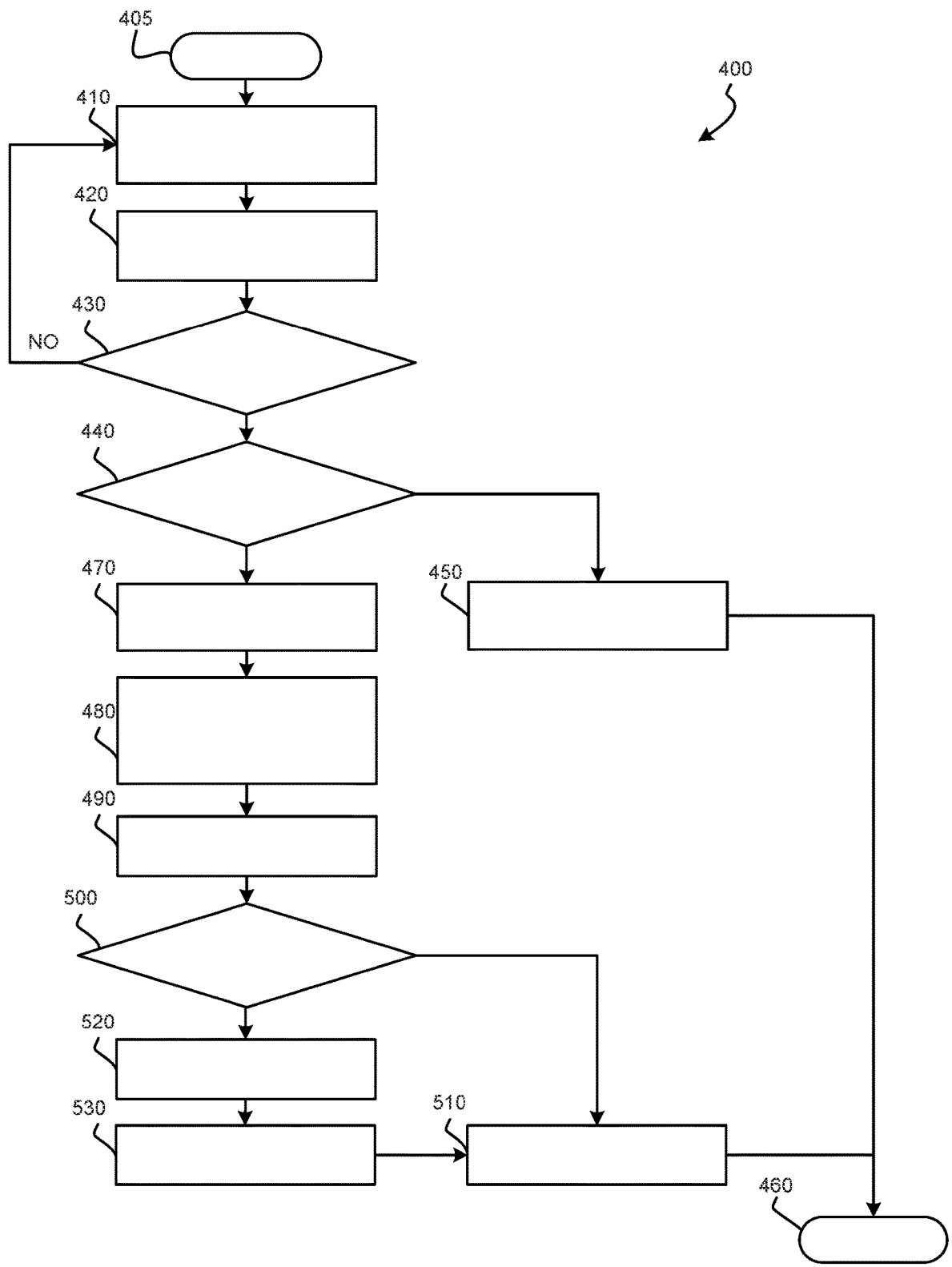
FIG. 4 is a flowchart illustrating a control method for controlling the vehicle based on the surface based control system, in accordance with various embodiments.

Referring now to FIG. 4, and with continued reference to FIGS. 1-3, flowcharts illustrate control methods 400 that can be performed by the system 100 of FIGS. 1-3 in accordance with the present disclosure. As can be appreciated in light of the disclosure, the order of operation within the methods is not limited to the sequential execution as illustrated in FIG. 4 but may be performed in one or more varying orders as applicable and in accordance with the present disclosure. In various embodiments, the method 400 can be scheduled to run based on one or more predetermined events, and/or can run continuously during operation of the autonomous vehicle 10.

In one example, the method 400 may begin at 405. The current road wheel angle, vehicle state, and desired path (waypoints to follow) are received at 410. Thereafter, surface value data is received at 420 and it is determined whether it is predicted that a change to low friction is expected in the upcoming path at 430. When low friction is not expected in the upcoming path at 430, the method 400 continues with receiving the control data at 410. When low friction is expected in the upcoming path at 430, it is determined whether automated lateral control is active at 440. When automated lateral control is not active at 440, the method 400 continues with generating a warning message to the driver indicating that a low friction area lies ahead at 450. Thereafter, the method may end at 460.

When automated lateral control is active at 440, the friction values are projected to each waypoint ahead at 470, for example, as discussed above. Model predictive control is used to determine an optimal road wheel angle and braking command at 480, for example, as discussed above.

Thereafter, a predicted tracking error is computed at 490 and compared to a threshold at 500. When the predicted tracking error is not greater than a threshold at 500, the lateral and longitudinal motion controller communicates control input commands to the actuator system of the vehicle to control the vehicle based on the updated waypoints at 510. Thereafter, the method may end at 460.

When the predicted tracking error is greater than a threshold at 500, the path planner re-distributes the path curvature to satisfy the friction limitation at 520 and communicates the new path to lateral and longitudinal motion controller at 530. Thereafter, the lateral and longitudinal motion controller communicates control input commands to the actuator system of the vehicle to control the vehicle based on the updated waypoints at 510. Thereafter, the method may end at 460.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising:
   receiving a first surface value associated with a first road surface area in an upcoming environment of the vehicle;
   receiving a second surface value associated with a second road surface area in the upcoming environment of the vehicle;
   determining a change in surface value based on the first surface value and the second surface value;
   projecting the second surface value to waypoints of an upcoming path; and
   in response to the change in surface value being greater than a threshold, adapting at least one of vehicle collision warning messages, vehicle braking control, vehicle steering control, and path planning based on the second surface mu value, the waypoints and the projected surface values.

2. The method of claim 1, wherein the adapting of the vehicle collision warning messages comprises adapting a timing of generating the vehicle collision warning messages based on the change in surface value.

3. The method of claim 1, wherein the adapting of the vehicle braking control comprises adapting a timing of generating a vehicle braking command based on the change in surface value.

4. The method of claim 1, wherein the adapting of the vehicle steering control comprises adapting a timing of generating a vehicle steering command based on the change in surface value.

5. The method of claim 1, wherein the adapting of the vehicle braking control comprises adapting a vehicle braking command based on model predictive control that is based on the projected surface values.

6. The method of claim 1, wherein the adapting of the vehicle steering control comprises adapting a steering control command based on model predictive control that is based on the projected surface values.

7. The method of claim 1, wherein the adapting of the path planning comprises comparing a path curvature to a maximum path curvature for a surface mu.

8. The method of claim 7, wherein the adapting of the path planning comprises modifying the path to position the vehicle in a new lane in response to a result of the comparing.

9. The method of claim 7, further comprising computing an error, and wherein the adaptation of path planning is performed in response to the error being greater than a threshold.

10. A system for controlling a vehicle, comprising:
    at least one sensor that senses road surfaces in an environment of the vehicle; and
    a control module configured to, by a processor, receive a first surface value associated with a first road surface area in an upcoming environment of the vehicle, receive a second surface value associated with a second road surface area in the upcoming environment of the vehicle; project the second surface value to waypoints of an upcoming path; determine a change in surface value based on the first surface value and the second surface value, and in response to the change in surface value being greater than a threshold, adapt at least one of vehicle collision warning messages, vehicle braking control, vehicle steering control, and path planning based on the second surface value, the waypoints and the projected surface values.

11. The system of claim 10, wherein the control module adapts the vehicle collision warning messages by adapting a timing of generating the vehicle collision warning messages based on the change in surface value.

12. The system of claim 10, wherein the control module adapts the vehicle braking control by adapting a timing of generating a vehicle braking command based on the change in surface value.

13. The system of claim 10, wherein the control module adapts the vehicle steering control by adapting a timing of generating a vehicle steering command based on the change in surface value.

14. The system of claim 10, wherein the control module adapts the vehicle braking control by adapting a vehicle braking command based on model predictive control that is based on the projected surface values.

15. The system of claim 10, wherein the control module adapts the vehicle steering control by adapting a steering control command based on model predictive control that is based on the projected surface value.

16. The system of claim 10, wherein the control module adapts the path planning by comparing a path curvature to a maximum path curvature for a surface mu.

17. The system of claim 16, wherein the control module adapts the path planning by modifying the path to position the vehicle in a new lane in response to a result of the comparing.

18. The system of claim 16, wherein the control module is further configured to compute an error, and adapt the path planning in response to the error being greater than a threshold.

* * * * *